Patented Jan. 14, 1936

2,027,446

UNITED STATES PATENT OFFICE 2,027,446

PROCESS FOR PREPARING GONAD STIMULATING HORMONE

Arthur E. Meyer, Rockford, Ill., assignor to Chappel Bros. Inc., Rockford, Ill., a corporation of Delaware No Drawing. Application January 29, 1934, Serial No. 708,833

9 Claims. (Cl. 167—74)

The present invention relates to an improved process for the production of concentrates of the gonad stimulating hormones, for medicinal purposes, from animal products containing the same.

Among the objects of the invention is the provision of an improved method for the extraction of the gonad stimulating hormones wherein a more desirable product is obtained, objectionable features of prior methods are overcome, the industrial production of such concentrates is rendered commercially feasible, and a greater yield of the hormones is obtained.

It has been found that the hormone, or hormones, which stimulate the gonad are present and may be obtained from a number of different parts of the animal body, important sources being the anterior lobe of the pituitary gland of animals and the blood of pregnant mares.

It should be noted that there is some difference of opinion and consequently some question as to whether the active principles of these extracts consist of a single hormone or of mixtures of two or more hormones, and throughout this application I use the term to indicate the active principles regardless of the number of hormones they may subsequently be found to contain.

The hormones, as present in the raw material, appear to be soluble in water and insoluble in the usual organic solvents such as acetone, ether, or alcohol. According to one method, the hormones are isolated by extracting them from the raw materials with aqueous solutions of very slightly acid or alkaline reaction such as phosphate buffer solutions. It has been found, however, that this method is effective to remove the desired hormones present only incompletely and that the extracts are of a low grade of purity containing other hormones of the gland, such as the growth stimulating hormone, as undesirable factors.

According to another method, the hormones are isolated by extraction with a mixture of equal parts of water and pyridine. This method has the advantage of materially higher yields of the hormones, but the product contains substantial quantities of other materials, particularly the so-called "pressure principle", for which there is now no known method of removal, and further the method is commercially impractical.

The pyridine must, of course, be removed from the extraction solution, and, because the active principle is relatively unstable at higher temperatures, this must be accomplished at a low temperature, preferably about 40° C. or lower. It has been found that the pyridine extraction solution cannot be treated by the usual methods to remove the pyridine because of violent foaming of the solution, and consequently it has been necessary to evaporate the pyridine at about 40° C. in a current of air. As a result, the pyridine is lost and cannot be re-used. Pyridine is a relatively expansive reagent, and, because of its loss at each extraction, the cost of the method becomes prohibitive for commercial purposes. Furthermore, the pyridine vapors are highly objectionable and cannot be discharged into the surrounding air in quantities such as required for commercial operations.

I have developed a method for the extraction of the desired hormones, which is free of the objectionable features of prior methods and which possesses material advantages thereover. By my method, larger yields are obtainable than heretofore possible, the extraction solution may be handled without difficulty, and the product contains no appreciable amount of the "pressure principle" above-mentioned.

As already pointed out, water alone gives a relatively poor extraction while the hormones are substantially insoluble in alcohols. On the other hand, I have found that certain concentrations of alcohols in water give even better results than extraction with a mixture of water and pyridine. The alcohols suitable for this purpose are limited to those miscible with or soluble to an appreciable extent in water, and I have found butyl and amyl alcohols to be preferable, though the other lower alcohols of the aliphatic series may be used with less satisfactory results. The improved yields, thus obtained, I have found to be due to the lower surface tension of the mixture, whereby a better penetration of the solvent into the raw material occurs, resulting in a greater percentage of the desired material being extracted. This is illustrated by the fact that a saturated solution of butyl alcohol has a surface tension of 261 by the Traube stalagmometer method, which measures the number of drops under uniform conditions resulting from a predetermined volume of liquid, water being 100 drops. Commercial amyl alcohol in saturated solution gives a surface tension of 225 drops, propyl alcohol in 10% solution has a surface tension of 162 drops, ethyl alcohol in 9½% solution has a surface tension of 141 drops, and methyl alcohol in 10% solution has a surface tension of 124 drops. The lower alcohols must be used in low concentration so as not to interfere with the solvent action of the water, that is, the concentration must be so balanced as to give the lowest surface tension consistent with the best solvent action.

As an example of one way of carrying out my process, I use pituitary powder prepared by treating the pituitary glands of suitable animals, such as horses, with acetone, as described in the U. S. Pharmacopoeia, Tenth edition. I may also use the blood serum of pregnant mares, treating the serum with a large volume of acetone, the precipitate being either treated directly by the process herein described or dried for subsequent use. I take, for example, 100 grams of such pituitary powder, on a dry basis, and treat the same with a solution of alcohol in water, preferably about a 6% solution of butyl or amyl alcohol, in order to extract the hormones from the powder. Four separate extractions are made using approximately 700 c. c. of the solvent for the first extraction and 600 c. c. for the three subsequent extractions. During these extractions, the powder is subjected to the solvent for approximately twelve hours. The combined liquid from the four extractions is filtered and subsequently evaporated in vacuo at a temperature below about 40° C. to a volume less than about 500 c. c. This 500 c. c. of concentrated extract is then treated with about 4½ volumes of acetone and allowed to stand overnight, whereupon it is filtered. It will be understood that the various amounts and proportions above enumerated are not given by way of limitation but merely by way of illustration, and that those skilled in the art may adjust these various proportions and amounts within wide limits to suit their individual fancy. The essential thing is that the pituitary powder is suitably treated with the solvent for the purpose of extracting the desired hormones.

The precipitate thus obtained is separated and purified to produce the finished concentrate. Any suitable method may be employed for purification and separation, the following having been found satisfactory. The precipitate is emulsified in about 1500 c. c. of water to which is added 750 c. c. of acetone. This should give a mixture containing about 33% acetone, in which mixture the desired hormones are soluble. The mixture is allowed to stand for three hours and is then filtered to remove the impurities remaining in suspension. The precipitate thus formed may, if desired, be extracted with a 33% solution of acetone in water and the filtrate therefrom be added back to the previous filtrate. In this manner, much of the active principle which the precipitate may contain will be removed. These combined filtrates are then evaporated in vacuo to substantial dryness, and the residue is emulsified in about 500 c. c. of water, about 70 c. c. of saturated alcoholic benzoic acid being added to the emulsion thus produced. Because of its low solubility in water, the benzoic acid precipitates from solution carrying with it a substantial part of one of the active factors or hormones originally present, known as the luteinizing hormone, thus separating the major portion of the luteinizing hormone from the material under treatment. The precipitate thus formed is washed with concentrated acetone and subsequently with water, about 150 c. c. of the latter being adequate. The residue contains the luteinizing hormone and may, if desired, be subsequently treated by known methods to purify the same.

The solution obtained in washing the last above-mentioned precipitate is united with the filtrate obtained on filtering the benzoic acid precipitate and is poured into about 4½ volumes of acetone, that is, sufficient acetone to result in a concentration of about 66% acetone, in which the hormone is insoluble, and allowed to stand until the precipitate is settled usually about twelve hours. The active material is then re-dissolved and re-precipitated several times in order to purify the same and remove last traces of benzoic acid. The precipitate is finally dissolved in about 100 c. c. of water, a phosphate buffer is added, if desired, to bring the reaction to a pH of about 7.1, and 0.4% of creosol may be added to preserve the material.

The pituitary powder may, as previously set forth, be extracted with solutions of any of the lower aliphatic alcohols including amyl alcohol, propyl alcohol, ethyl alcohol, and methyl alcohol. In using propyl, ethyl, and methyl alcohols, I have found it advisable to use in the neighborhood of a 10% solution, but I have found that these alcohols in general give lower yields, the yields being about in proportion to the surface tension of the mixtures.

As already pointed out, my process results in materially higher yields of the active principles than have heretofore been obtainable, and consequently the cost of production is correspondingly decreased. The process results in a purer product and substantially complete elimination of the pressure principle and growth stimulating hormone from the product which permits of administration without danger from the effects of these impurities.

My process is also such that the material can be produced industrially at a commercially feasible price due to the more complete extraction of the active principle, the fact that the reagents are easily and cheaply separated and recovered from the active principle and may be re-used in subsequent extractions, and the reagents are relatively cheap in price and harmless in nature.

There is also a material saving in time over the only prior known process which gives commercially feasible yields. As a result of the advantages described above, the hormone concentrates may be produced at a commercially feasible cost, thereby rendering the material generally available for medicinal use.

I claim:

1. In the process for obtaining the alcohol and acetone insoluble pituitary gonad stimulating hormones from animal tissue containing the same, the step which comprises extracting the said material with a dilute aqueous solution of a lower aliphatic alcohol.

2. The process defined in claim 1, wherein the alcohol employed is butyl alcohol.

3. The process defined in claim 1, wherein the alcohol employed is amyl alcohol.

4. In the process for obtaining the alcohol and acetone insoluble pituitary gonad stimulating hormones from animal tissue containing the same, the step which comprises extracting said material with an aqueous solution of a lower aliphatic alcohol in concentration less than about 10%.

5. A process for extracting the alcohol and acetone insoluble pituitary gonad stimulating hormones from animal tissue containing the same which comprises extracting said tissue with a dilute aqueous solution of a lower aliphatic alcohol having a surface tension of more than 120 drops by the Traube stalagmometer method.

6. A process for extracting the alcohol and acetone insoluble pituitary gonad stimulating hormones from animal tissue containing the same which comprises extracting said tissue with a dilute aqueous solution of a reagent taken from the group, comprising amyl alcohol, butyl alcohol, propyl alcohol, ethyl alcohol, and methyl alcohol.

7. In the process for obtaining the alcohol and acetone insoluble pituitary gonad stimulating hormones from animal tissue containing the same, the steps comprising treating said tissue with a dilute aqueous solution of a lower aliphatic alcohol to extract the hormones, and removing the alcohol from the solution thus obtained by evaporation in vacuo.

8. The process defined in claim 7, wherein the alcohol employed is butyl alcohol.

9. The process defined in claim 7, wherein the alcohol employed is amyl alcohol.

ARTHUR E. MEYER.